(12) United States Patent
Pihlsgård et al.

(10) Patent No.: US 11,845,397 B2
(45) Date of Patent: Dec. 19, 2023

(54) REMOTE CONTROL OF A SYSTEM OF KEY RELATED FUNCTIONS OF A VEHICLE

(71) Applicant: Ningbo Geely Automobile Research & Development Co., Ltd., Ningbo (CN)

(72) Inventors: Måns Pihlsgård, Gothenburg (SE); Linda Karlsson, Partille (SE); Magnus Nilsson, Floda (SE); Yijun Zheng, Västra Frölunda (SE)

(73) Assignee: NINGBO GEELY AUTOMOBILE RESEARCH & DEVELOPMENT CO., Ningbo (CN)

( * ) Notice: Subject to any disclaimer, the term of this patent is extended or adjusted under 35 U.S.C. 154(b) by 0 days.

(21) Appl. No.: 17/705,288

(22) Filed: Mar. 26, 2022

(65) Prior Publication Data

US 2022/0212629 A1 Jul. 7, 2022

Related U.S. Application Data

(63) Continuation of application No. PCT/CN2020/111864, filed on Aug. 27, 2020.

(30) Foreign Application Priority Data

Oct. 23, 2019 (EP) .................................... 19204762

(51) Int. Cl.
*B60R 25/24* (2013.01)
*G07C 9/00* (2020.01)
*H04L 67/12* (2022.01)

(52) U.S. Cl.
CPC ........ *B60R 25/246* (2013.01); *G07C 9/00309* (2013.01); *H04L 67/12* (2013.01); *G07C 2009/00388* (2013.01); *G07C 2009/00539* (2013.01)

(58) Field of Classification Search
None
See application file for complete search history.

(56) References Cited

U.S. PATENT DOCUMENTS

| 6,424,056 | B1 | 7/2002 | Irvin |
| 8,947,203 | B2 | 2/2015 | Kolar |
| 9,710,985 | B2 * | 7/2017 | Tomita ............... G07C 9/00182 |
| 10,235,820 | B2 | 3/2019 | Bartels |

(Continued)

FOREIGN PATENT DOCUMENTS

| CN | 203117709 U | 8/2013 |
| CN | 106114408 A | 11/2016 |

(Continued)

OTHER PUBLICATIONS

International Search Report from corresponding International Application No. PCT/CN2020/111864, dated Nov. 27, 2020, 2 pages.

*Primary Examiner* — Carlos Garcia
(74) *Attorney, Agent, or Firm* — TUCKER ELLIS LLP

(57) ABSTRACT

A method for remotely controlling a system of key related functions of a vehicle, the system is connectable with a remote unit over a communication network, is capable of transferring audio data. The method includes receiving at the vehicle over the communication network a sequence for the system wherein the sequence comprises a first sound sequence, and performing a key related function in the system in response to receiving the sequence.

13 Claims, 4 Drawing Sheets

(56) References Cited

U.S. PATENT DOCUMENTS

| | | | | |
|---|---|---|---|---|
| 11,164,408 | B2* | 11/2021 | Bryla | G07C 9/00309 |
| 11,265,112 | B2* | 3/2022 | Nilsson | H04L 1/1685 |
| 2009/0140878 | A1* | 6/2009 | Ryan, II | B60R 25/2009 |
| | | | | 340/5.61 |
| 2012/0229253 | A1* | 9/2012 | Kolar | B60R 25/257 |
| | | | | 340/5.61 |
| 2014/0159866 | A1 | 6/2014 | Hwang | |
| 2014/0324591 | A1 | 10/2014 | Kim | |
| 2016/0275732 | A1* | 9/2016 | Tomita | G07C 9/00309 |
| 2017/0361806 | A1 | 12/2017 | Scheim | |
| 2021/0058194 | A1* | 2/2021 | Nilsson | H04W 76/25 |

FOREIGN PATENT DOCUMENTS

| | | |
|---|---|---|
| CN | 106846563 A | 6/2017 |
| CN | 107430811 A | 12/2017 |
| WO | 2018063486 A1 | 4/2018 |

* cited by examiner

REMOTE CONTROL OF A SYSTEM OF KEY RELATED FUNCTIONS OF A VEHICLE

RELATED APPLICATION DATA

This application is a continuation of International Patent Application No. PCT/CN2020/111864, filed Aug. 27, 2020, which claims the benefit of European Patent Application No. 19204762.9, filed Oct. 23, 2019, the disclosures of which are incorporated herein by reference in their entireties.

TECHNICAL FIELD

The present disclosure relates generally to the field of remote control of a system. More particularly, it relates to remote control of a system of key related functions of a vehicle.

BACKGROUND

It is known that a vehicle may be remotely locked or unlocked via a remote key over radio communication.

A drawback of known methods for remotely locking or unlocking the vehicle via the remote key over radio communication is that a user of the remote key is required to be within a short distance range of a radio transceiver of the vehicle.

It is also known that a vehicle may be remotely locked or unlocked via an application over packet-switched communication.

A drawback of known methods for remotely locking or unlocking the vehicle via the application over packet-switched communication is that the vehicle is required to be capable of communicating with the application over a packet-switched network.

Therefore, there is a need for alternative approaches to remote control of a system of key related functions of a vehicle.

SUMMARY

It should be emphasized that the term "comprises/comprising" when used in this specification is taken to specify the presence of stated features, integers, steps, or components, but does not preclude the presence or addition of one or more other features, integers, steps, components, or groups thereof. As used herein, the singular forms "a", "an" and "the" are intended to include the plural forms as well, unless the context clearly indicates otherwise.

Generally, when an arrangement is referred to herein, it is to be understood as a physical product; e.g., an apparatus. The physical product may comprise one or more parts, such as controlling circuitry in the form of one or more controllers, one or more processors, or the like.

An object of some embodiments is to provide alternative approaches to remote control of a system of key related functions of a vehicle.

According to a first aspect, this is achieved by a method for remotely controlling a system of key related functions of a vehicle wherein the system is connectable with a remote unit over a communication network capable of transferring audio data.

The method comprises receiving at the vehicle over the communication network a sequence for the system wherein the sequence comprises a first sound sequence.

The method further comprises performing a key related function in the system in response to receiving the sequence.

An advantage of some embodiments is that a method for remote control of a system of key related functions of a vehicle is provided.

Another advantage of some embodiments is that the method for remote control of a system of key related functions of a vehicle provides a user of a remote unit with an ability to remotely control the system of key related functions of the vehicle even if the user of the remote unit is not within radio distance range to the vehicle.

Yet another advantage of some embodiments is that the method for remote control of a system of key related functions of a vehicle enables a vehicle to be remotely controlled even if the vehicle is not capable of communicating with a user of a remote unit over a packet-switched network.

In some embodiments, the method further comprises transmitting from the remote unit over the communication network the sequence for the system to the vehicle wherein the sequence comprises the first sound sequence.

An advantage of some embodiments is that the user of the remote unit may select a key related function of a vehicle and transmit the sound sequence corresponding to the selected key related function to the vehicle.

In some embodiments, the method further comprises transmitting from the system over the communication network a challenge response to the remote unit in response to receiving the sequence at the vehicle wherein the challenge response comprises a second sound sequence, and transmitting from the remote unit over the communication network a response to the system wherein the response comprises a third sound sequence.

An advantage of some embodiments is that the vehicle authenticates the user of the remote unit by challenging the remote unit to provide an expected response in order to perform the selected key related function of the vehicle. Hence, due to the authentication, the risk that any possibly malicious remote unit, i.e. a remote unit not able of being authenticated by the vehicle, trying to control the key related functions of the vehicle is minimized.

In some embodiments, the remote unit comprises a remote key comprising a Human Machine Interface, a loudspeaker capable of outputting sound sequences, and a microphone capable of receiving sound sequences and/or a mobile communication device comprising an application connectable with the system of the vehicle over the communication network and capable of outputting/receiving sound sequences.

An advantage of some embodiments is that a user of a remote unit may be enabled to select a key related function of the vehicle on the remote unit and transmit a sound sequence corresponding to the selected key related function to the vehicle from the remote unit and receive a sound sequence corresponding to a challenge response from the vehicle at the remote unit as well as transmitting a response to the challenge response to the vehicle from the remote unit.

In some embodiments, the sound sequence comprises a sound with tones at high and/or low frequencies each with a certain duration and/or a sound with tones at high and/or low amplitudes each with a certain duration.

An advantage of some embodiments is that the sound sequence may be distinguishable by its frequency and/or its amplitude and/or its duration in order to distinguish the sound sequences as a first, second, or third sound sequence.

In some embodiments, the communication network comprises any one of a cellular communication network, a mobile communication network, a packet-switched network, and a wired network.

An advantage of some embodiments is that the communication network enables sound waves to be transferred over the network so that a system of key related functions of a vehicle may be remotely controlled via sound sequences.

A second aspect is a computer program product comprising a non-transitory computer readable medium, having thereon a computer program comprising program instructions. The computer program is loadable into a data processing unit and configured to cause execution of the method steps performed by the system of key related functions of the vehicle and/or the method steps performed by the remote unit according to the first aspect when the computer program is run by the data processing unit.

A third aspect is an arrangement for remotely controlling a system of key related functions of a vehicle wherein the system is connectable with the arrangement over a communication network capable of transferring audio data.

The arrangement comprises a memory comprising executable instructions, one or more processors configured to communicate with the memory wherein the one or more processors are configured to cause the arrangement to transmit over the communication network a sequence for the system to the vehicle wherein the sequence comprises a first sound sequence, and receive from the system over the communication network a challenge response wherein the challenge response comprises a second sound sequence.

The one or more processors are further configured to cause the arrangement to transmit over the communication network a response for the system to the vehicle in response to receiving the challenge response wherein the response comprises a third sound sequence.

An advantage of some embodiments is that an arrangement for remote control of a system of key related functions of a vehicle is provided.

Another advantage of some embodiments is that the arrangement for remote control of a system of key related functions of a vehicle provides a user of a remote unit with an ability to remotely control the system of key related functions of the vehicle even if the user of the remote unit is not within radio distance range to the vehicle.

Yet another advantage of some embodiments is that the arrangement for remote control of a system of key related functions of a vehicle enables a vehicle to be remotely controlled even if the vehicle is not capable of communicating with a user of a remote unit over a packet-switched network.

In some embodiments, the arrangement comprises a Human Machine Interface, a loudspeaker capable of outputting sound sequences, and a microphone capable of receiving sound sequences and/or a mobile communication device comprising an application connectable with the system of the vehicle over the communication network and capable of outputting/receiving sound sequences.

An advantage of some embodiments is that a user of a remote unit may be enabled to select a key related function of the vehicle on the remote unit and transmit a sound sequence corresponding to the selected key related function to the vehicle from the remote unit and receive a sound sequence corresponding to a challenge response from the vehicle at the remote unit as well as transmitting a response to the challenge response to the vehicle from the remote unit.

In some embodiments, the arrangement further comprises a memory comprising at least one sound sequence for at least one key related function for the system of key related functions of the vehicle.

An advantage of some embodiments is that at least one sound sequence, e.g. the first sound sequence, corresponding to at least one key related function of the vehicle may be stored in the remote unit for selection by a user.

A fourth aspect is a remote key and/or a mobile communication device comprising the arrangement according to the third aspect.

A fifth aspect is an arrangement for performing a key related function in a system of key related functions of a vehicle wherein the system is connectable with an arrangement for remotely controlling the system over a communication network capable of transferring audio data.

The arrangement comprises a memory comprising executable instructions, one or more processors configured to communicate with the memory wherein the one or more processors are configured to cause the arrangement receive over the communication network a sequence for the system wherein the sequence comprises a first sound sequence, and perform a key related function in the system in response to receiving the sequence.

An advantage of some embodiments is that an arrangement for remote control of a system of key related functions of a vehicle is provided.

Another advantage of some embodiments is that the arrangement for remote control of a system of key related functions of a vehicle provides a user of a remote unit with an ability to remotely control the system of key related functions of the vehicle even if the user of the remote unit is not within radio distance range to the vehicle.

Yet another advantage of some embodiments is that the arrangement for remote control of a system of key related functions of a vehicle enables a vehicle to be remotely controlled even if the vehicle is not capable of communicating with a user of a remote unit over a packet-switched network.

In some embodiments, the one or more processors are configured to further cause the arrangement to transmit over the communication network a challenge response to the arrangement for remotely controlling the system in response to receiving the sequence wherein the challenge response comprises a second sound sequence, and receive a response over the communication network from the arrangement for remotely controlling the system in response to transmitting the challenge response wherein the response comprises a third sound sequence.

An advantage of some embodiments is that the vehicle authenticates the user of the remote unit by challenging the remote unit to provide an expected response in order to perform the selected key related function of the vehicle. Hence, due to the authentication, the risk that any possibly malicious remote unit, i.e. a remote unit not able of being authenticated by the vehicle, trying to control the key related functions of the vehicle is minimized.

In some embodiments, the arrangement further comprises a memory comprising at least one sound sequence for at least one key related function for the system of key related functions of the vehicle.

An advantage of some embodiments is that at least one sound sequence, e.g. the first sound sequence, corresponding to at least one key related function of the vehicle may be stored in a memory of the vehicle in order for the vehicle to look up the key related function based on the stored at least one sound sequence.

A sixth aspect is a system of key related functions of a vehicle comprising the arrangement according to the fifth aspect.

Any of the above aspects may additionally have features identical with or corresponding to any of the various features as explained above for any of the other aspects.

BRIEF DESCRIPTION OF THE DRAWINGS

Further objects, features and advantages will appear from the following detailed description of embodiments, with reference being made to the accompanying drawings. The drawings are not necessarily to scale, emphasis instead being placed upon illustrating the example embodiments.

DETAILED DESCRIPTION

As already mentioned above, it should be emphasized that the term "comprises/comprising" when used in this specification is taken to specify the presence of stated features, integers, steps, or components, but does not preclude the presence or addition of one or more other features, integers, steps, components, or groups thereof. As used herein, the singular forms "a", "an" and "the" are intended to include the plural forms as well, unless the context clearly indicates otherwise.

Embodiments of the present disclosure will be described and exemplified more fully hereinafter with reference to the accompanying drawings. The solutions disclosed herein can, however, be realized in many different forms and should not be construed as being limited to the embodiments set forth herein.

In the following, embodiments will be described where alternative approaches to remote control of a system of key related functions of a vehicle are provided.

It is assumed that each vehicle comprises its own unique identification, e.g. a telephone number, enabling a system of key related functions of the vehicle to be connectable and capable of communication with any arrangement, e.g. a remote unit, over a communication network capable of transferring audio data.

Further, it is assumed that each vehicle and remote unit comprises a loud speaker and a microphone capable of receiving and transmitting audio data e.g. a sound sequence.

Moreover, it is assumed that a vehicle user may comprise any one of a vehicle user occupying a seat in a vehicle, a vehicle user in proximity of the vehicle, a vehicle user at a distance from the vehicle, and a remote vehicle user, i.e. the vehicle user being at a remote location from the vehicle, and wherein the vehicle user is capable of remote control of a system of key related functions of the vehicle.

Figure 1:
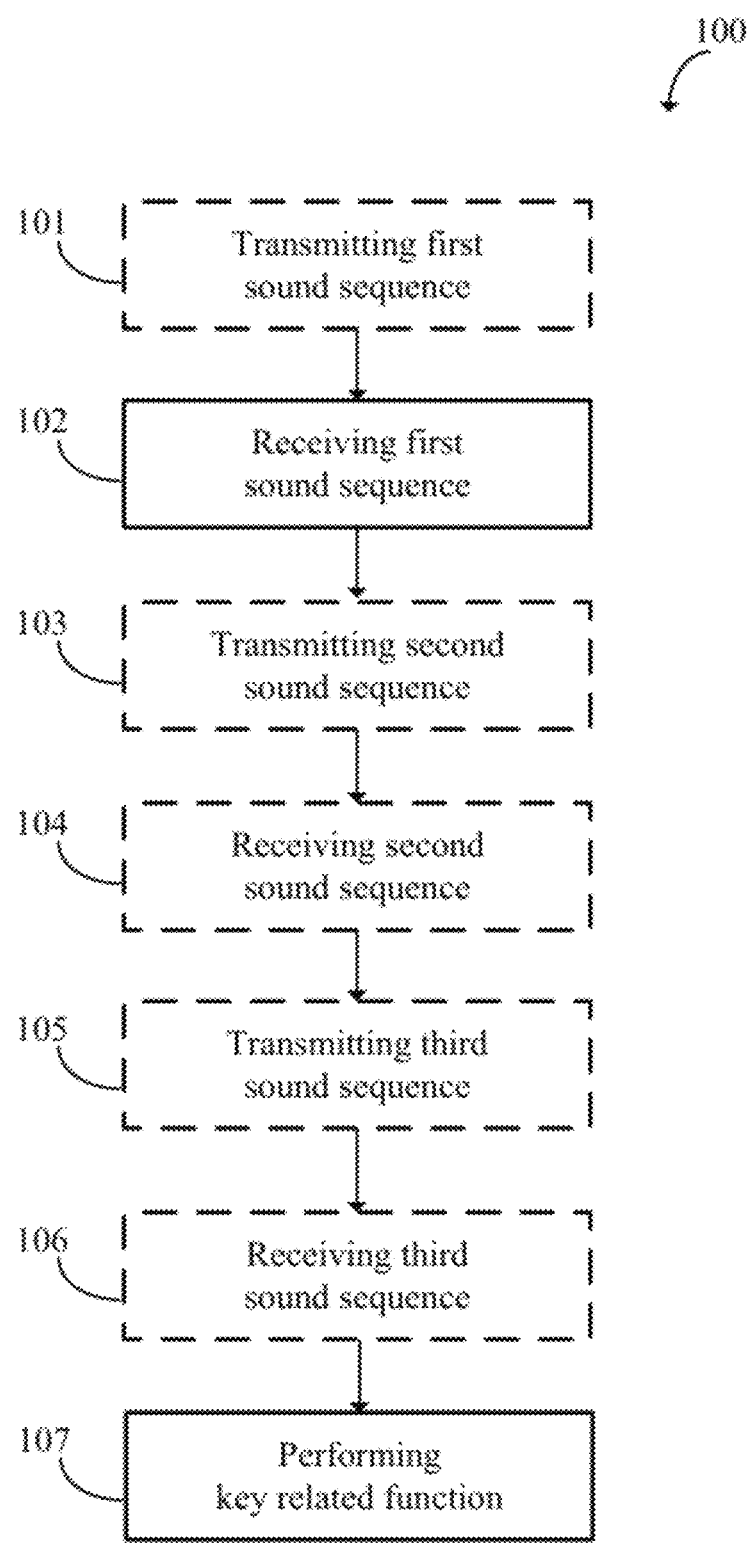
FIG. 1 is flowchart illustrating example method steps according to some embodiments.

FIG. 1 is a flowchart illustrating example method steps according to some embodiments.

The method 100 is for remotely controlling a system of key related functions of a vehicle wherein the system is connectable with a remote unit over a communication network capable of transferring audio data.

Figure 3A:
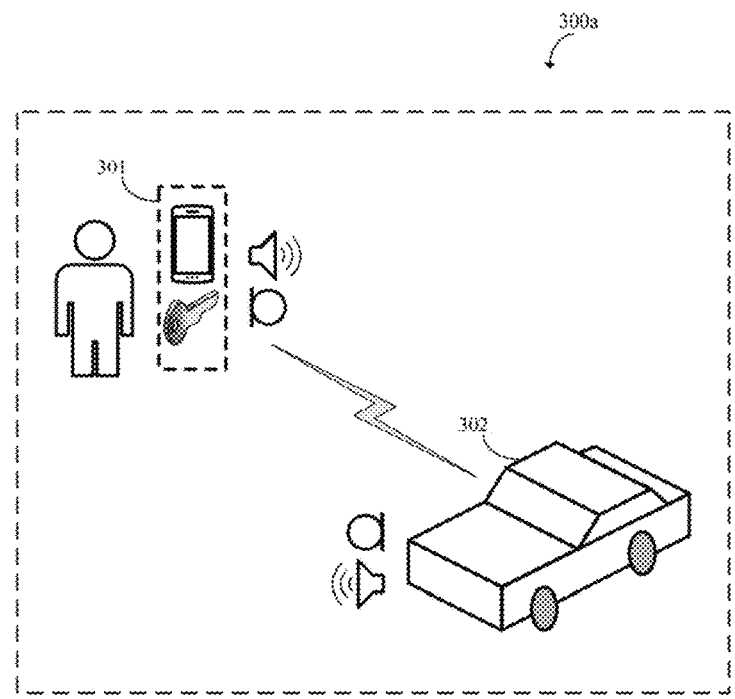
FIG. 3A is a schematic overview illustrating an example system according to some embodiments.
Figure 4:
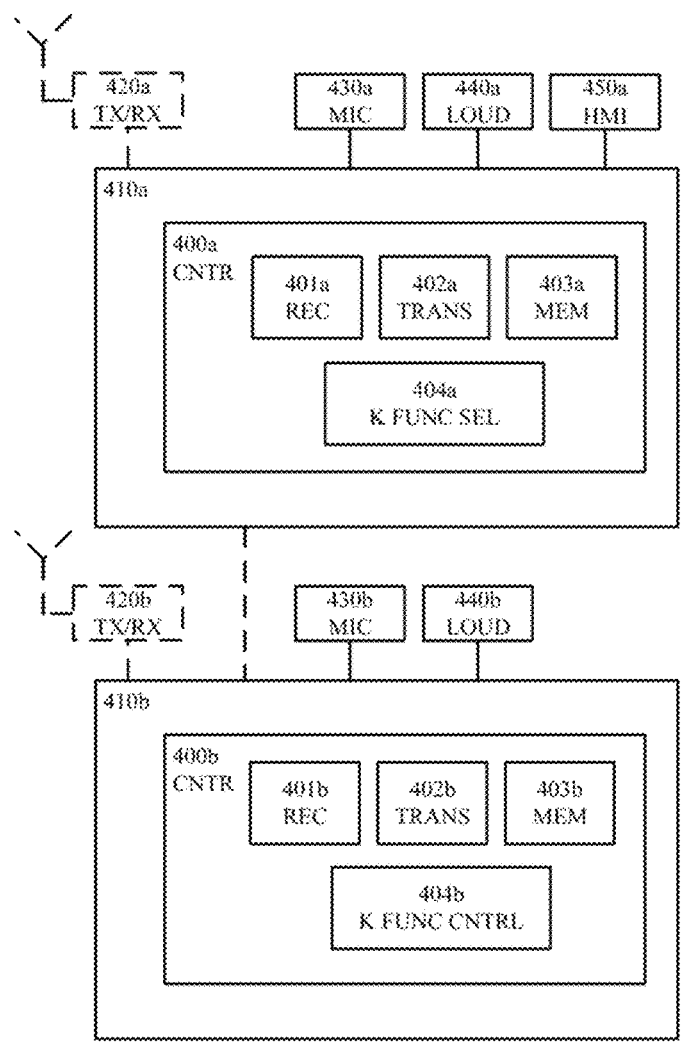
FIG. 4 is a schematic block diagram illustrating example arrangements according to some embodiments.
Figure 5:
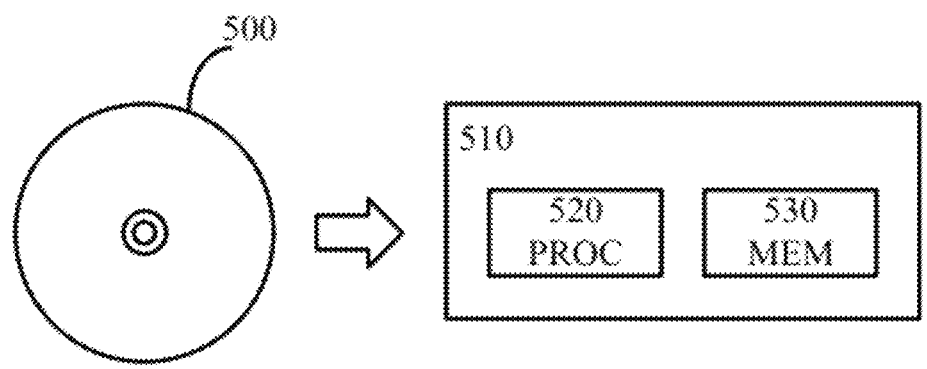
FIG. 5 is a schematic drawing illustrating an example computer readable medium according to some embodiments.

Thus, the method 100 may, for example, be performed by arrangements 400*a* and 400*b* of FIG. 4 and/or a computer program 500 of FIG. 5 in a system 300*a* of FIG. 3A.

In step 101, in some embodiments, a sequence for the system is transmitted from the remote unit over the communication network to the vehicle wherein the sequence comprises a first sound sequence.

A sound sequence may comprise any sound and/or vibrations capable of being distinguishable either in frequency and/or in amplitude for a certain duration of time.

In some embodiments, the sound sequence comprises a sound with tones at high and/or low frequencies each with a certain duration and/or a sound with tones at high and/or low amplitudes each with a certain duration.

For example, the first sound sequence 'A' comprising tones with distinguishable frequency and amplitude with a certain duration for a certain key related function which may be stored in a memory storage of the remote unit may be retrieved from the memory storage and transmitted over the communication network to the vehicle in order for the vehicle to perform the key related function.

In step 102, the sequence for the system is received at the vehicle over the communication network wherein the sequence comprises the first sound sequence.

For example, the first sound sequence 'A' may be received at the vehicle.

In step 103, in some embodiments, a challenge response for the remote unit is transmitted from the vehicle over the communication network to the remote unit in response to receiving the sequence at the vehicle wherein the challenge response comprises a second sound sequence.

For example, a challenge response 'B' may be generated at the system in response to receiving the first sound sequence 'A' wherein the generation of the challenge response may comprise the first sound sequence 'A' as a parameter.

In step 104, in some embodiments, the challenge response from the system is received at the remote unit over the communication network wherein the challenge response comprises the second sound sequence.

For example, the challenge response 'B' may be received at the remote unit.

In step 105, in some embodiments, a response for the system is transmitted from the remote unit over the communication network to the vehicle wherein the response comprises a third sound sequence.

For example, a response 'C' may be generated in the remote unit in response to the challenge response 'B' wherein the generation of the response may comprise the second sound sequence 'B'.

In step 106, in some embodiments, the response from the remote unit is received at the vehicle over the communication network wherein the response comprises the third sound sequence.

For example, the response 'C' may be received at the vehicle.

In step 107, a key related function in the system is performed in response to receiving the sequence.

For example, the first sound sequence 'A' may correspond to the key related function of opening the trunk of the vehicle and in response to receiving the first sound sequence 'A' the vehicle may perform the key related function of opening the trunk.

In some embodiments, the remote unit comprises a remote key comprising a Human Machine Interface, a loudspeaker capable of outputting sound sequences, and a microphone capable of receiving sound sequences and/or a mobile communication device comprising an application connectable with the system of the vehicle over the communication network and capable of outputting/receiving sound sequences.

For example, a remote key may comprise a key fob which in turn may comprise one or more buttons and/or a one-row display and/or a microphone for receiving spoken commands as a Human Machine Interface for selecting a key related function.

Alternatively or additionally, the remote unit may comprise any device comprising a Human Machine Interface, a loudspeaker capable of outputting sound sequences, and a microphone capable of receiving sound sequences.

Hence, the method enables remote control of a system of key related functions of a vehicle without requiring a user of a remote key to be within a short distance range of a radio transceiver of the vehicle and without requiring the vehicle to be capable of communicating with an application over a packet-switched network.

Figure 2:
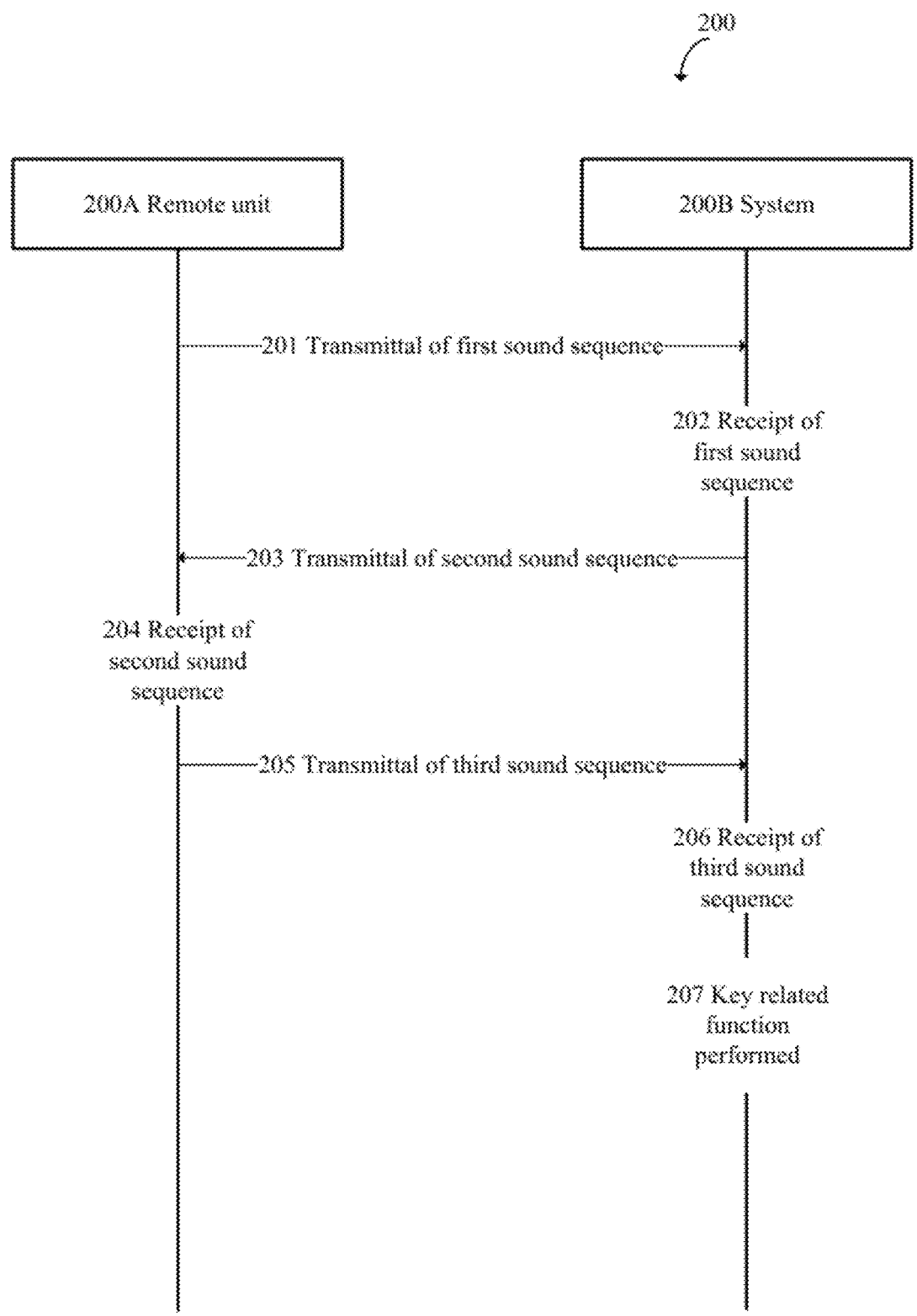
FIG. 2 is a sequence diagram illustrating example signaling steps according to some embodiments.

FIG. 2 is a sequence diagram illustrating example signaling steps according to some embodiments.

The signaling 200 is for remotely controlling a system of key related functions of a vehicle wherein the system is connectable with a remote unit over a communication network capable of transferring audio data.

Thus, the signaling 200 may, for example, be performed by arrangements 400a and 400b of FIG. 4 and/or a computer program 500 of FIG. 5 in a system 300a of FIG. 3A.

In step 201, corresponding to step 101 in method 100 of FIG. 1, a sound sequence for the system 200B is transmitted from the remote unit 200A over the communication network to the system 200B wherein the sequence comprises a first sound sequence.

In step 202, corresponding to step 102 in method 100 of FIG. 1, the sequence for the system 200B is received at the system 200B over the communication network wherein the sequence comprises the first sound sequence.

In step 203, corresponding to step 103 in method 100 of FIG. 1, a challenge response for the remote unit 200A is transmitted from the system 200B over the communication network to the remote unit 200A in response to receiving the sequence at the system 200B wherein the challenge response comprises a second sound sequence.

In step 204, corresponding to step 104 in method 100 of FIG. 1, the challenge response from the system 200B is received at the remote unit 200A over the communication network wherein the challenge response comprises the second sound sequence.

In step 205, corresponding to step 105 in method 100 of FIG. 1, a response for the system 200B is transmitted from the remote unit 200A over the communication network to the system 200B wherein the response comprises a third sound sequence.

In step 206, corresponding to step 106 in method 100 of FIG. 1, the response from the remote unit 200A is received at the system 200B over the communication network wherein the response comprises the third sound sequence.

In step 207, corresponding to step 107 in method 100 of FIG. 1, a key related function in the system 200B is performed in response to receiving the sequence.

FIG. 3A is a schematic overview illustrating an example system according to some embodiments.

The system 300a is for remotely controlling a system of key related functions of a vehicle wherein the system is connectable with a remote unit over a communication network capable of transferring audio data.

Thus, the system 300a may, for example, comprise the arrangements 400a and 400b of FIG. 4 and/or a computer program 500 of FIG. 5 and perform the method of FIG. 1 and/or the signaling of FIG. 2.

FIG. 3A illustrates the system 300a comprising a remote unit, corresponding to arrangement 400a of FIG. 4 and a vehicle comprising a system of key related functions, corresponding to arrangement 400b of FIG. 4.

A remote unit 301 comprises an arrangement for remotely controlling a system of key related functions of a vehicle 302 wherein the system is connectable with the arrangement over a communication network capable of transferring audio data.

The remote unit 301 comprises the arrangement which in turn comprises a memory comprising executable instructions, one or more processors configured to communicate with the memory wherein the one or more processors are configured to cause the arrangement to transmit over the communication network a sequence for the system to the vehicle wherein the sequence comprises a first sound sequence, and receive from the system over the communication network a challenge response wherein the challenge response comprises a second sound sequence.

The one or more processors are further configured to cause the arrangement to transmit over the communication network a response for the system to the vehicle in response to receiving the challenge response wherein the response comprises a third sound sequence.

In some embodiments, the arrangement in the remote unit 301 comprises a Human Machine Interface, a loudspeaker capable of outputting sound sequences, and a microphone capable of receiving sound sequences.

In some embodiments, the arrangement in the remote unit 301 comprises a mobile communication device comprising an application connectable with the system of the vehicle over the communication network and capable of outputting/receiving sound sequences.

In some embodiments, the arrangement in the remote unit 301 may comprise a remote key comprising a Human Machine Interface, a loudspeaker capable of outputting sound sequences, and a microphone capable of receiving sound sequences and a mobile communication device comprising an application connectable with the system of the vehicle over the communication network and capable of outputting/receiving sound sequences.

In some embodiments, the arrangement in the remote unit 301 may further comprise a memory storage comprising at least one sound sequence for at least one key related function, e.g. a locking or unlocking function, for the system of key related functions or the vehicle.

Alternatively or additionally, the remote unit 301 may comprise any device comprising a Human Machine Interface, a loudspeaker capable of outputting sound sequences, and a microphone capable of receiving sound sequences.

For example, the remote unit 301 may be configured to transmit a sound sequence, i.e. over sound waves, for a key related function e.g. for unlocking a vehicle. The user of the remote unit 301 may e.g. call the vehicle 302 as it has its own unique identification, e.g. a telephone number, and hold the remote unit 301 e.g. the remote key close to the mobile communication device and select the key related function via the Human Machine Interface on the remote key. The vehicle 302 will then recognize the sound sequence received over the call and challenge the remote unit to provide a correct response e.g. a rolling code. If the response is correct, then the vehicle will perform the key related function as selected by the user of the remote unit 301.

Alternatively or additionally, if the remote unit only comprises the mobile communication device there is no need for the remote key as the mobile communication device is capable of, via an application in the mobile communication device, receiving a selection of the key related function from the vehicle user. The vehicle 302 will then recognize the sound sequence received over the call in the same manner as if the remote key had been used.

A vehicle 302 comprises an arrangement for performing a key related function in a system of key related functions of a vehicle wherein the system is connectable with an arrangement for remotely controlling the system over a communication network capable of transferring audio data.

The system in the vehicle 302 comprises the arrangement which in turn comprises a memory comprising executable instructions, one or more processors configured to communicate with the memory wherein the one or more processors are configured to cause the arrangement receive over the communication network a sequence for the system wherein the sequence comprises a first sound sequence, and perform a key related function in the system in response to receiving the sequence.

In some embodiments, the one or more processors are configured to further cause the arrangement in the vehicle 302 to transmit over the communication network a challenge response to the arrangement for remotely controlling the system in response to receiving the sequence wherein the challenge response comprises a second sound sequence, and receive a response over the communication network from the arrangement for remotely controlling the system in response to transmitting the challenge response wherein the response comprises a third sound sequence.

In some embodiments, the arrangement in the vehicle 302 further comprises a memory comprising at least one sound sequence for at least one key related function, e.g. a locking or unlocking function, for the system of key related functions of the vehicle.

Hence, the method enables remote control of a system of key related functions of a vehicle without requiring a user of a remote key to be within a short distance range of a radio transceiver of the vehicle and without requiring the vehicle to be capable of communicating with an application over a packet-switched network.

Figure 3B:
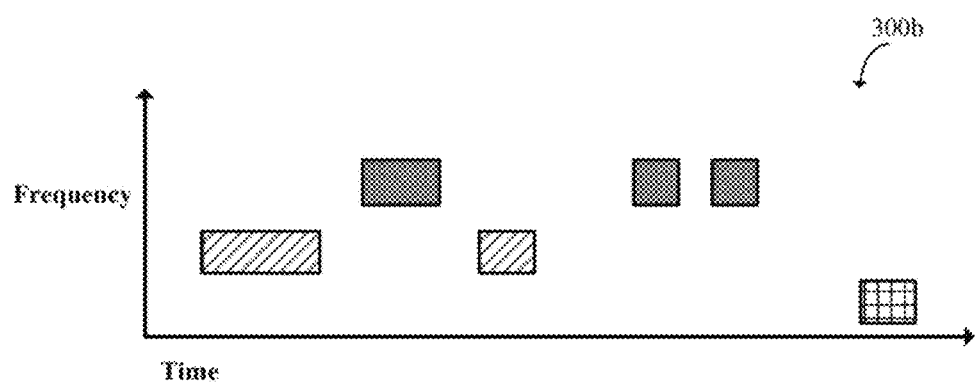
FIG. 3B is a frequency diagram illustrating an example sequence according to some embodiments.

FIG. 3B is a frequency diagram illustrating an example sequence according to some embodiments.

FIG. 3B illustrates a sound sequence which may, for example, comprise the first, second, or third sound sequence according to the method 100 of FIG. 1, and/or signaling 200 of FIG. 2, and/or be stored in the arrangements 400a and 400b of FIG. 4 in the system 300a of FIG. 3A.

The sound sequence may comprise any sound and/or vibrations capable of being distinguishable either in frequency and/or in amplitude for a certain duration of time.

Hence, the sound sequence may be distinguishable in frequency i.e. the number of waves per second.

FIG. 3B further illustrates the sound sequence comprising sound and/or vibrations at three different frequencies (illustrated by the different patterns) for a certain duration of time.

Figure 3C:
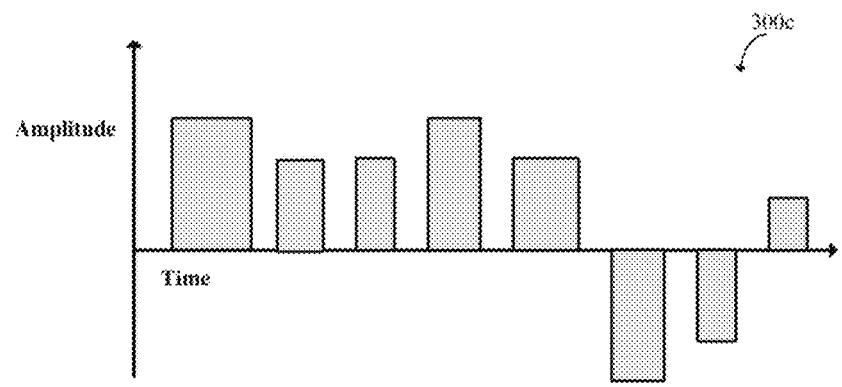
FIG. 3C is an amplitude diagram illustrating an example sequence according to some embodiments.

FIG. 3C is an amplitude diagram illustrating an example sequence according to some embodiments.

FIG. 3C illustrates a sound sequence which may, for example, comprise the first, second, or third sound sequence according to the method 100 of FIG. 1, and/or signaling 200 of FIG. 2, and/or be stored in the arrangements 400a and 400b of FIG. 4 in the system 300a of FIG. 3A.

The sound sequence may comprise any sound and/or vibrations capable of being distinguishable either in frequency and/or in amplitude for a certain duration of time.

Hence, the sound sequence may be distinguishable in amplitude i.e. the maximum height of the wave from its resting position.

FIG. 3C further illustrates the sound sequence comprising sound and/or vibrations at different amplitudes (illustrated by the different heights) for a certain duration of time.

FIG. 4 is a schematic block diagram illustrating example arrangements according to some embodiments.

The arrangements 400a and 400b are for remotely controlling a system of key related functions of a vehicle wherein the system is connectable with a remote unit over a communication network capable of transferring audio data.

Thus, the arrangements 400a and 400b may, for example, be comprised in the system 300a of FIG. 3A and/or perform the method of FIG. 1 and/or the signaling of FIG. 2.

The arrangements 400a and 400b are configured to communicate over a communication network capable of transferring audio data.

The arrangement 400a is configured to be associated or operatively connected with a microphone arrangement MIC 430a, e.g. microphone circuitry or microphone module, configured to receive sound sequences, a loudspeaker arrangement LOUD 440a, e.g. loudspeaker circuitry or loudspeaker module, configured to output sound sequences, and a Human Machine Interface arrangement HMI 450a, e.g. Human Machine Interface circuitry or Human Machine Interface module, configured to provide a user interface.

The arrangement 400a may be configured to, in some embodiments, to be associated or operatively connected with a transmitting/receiving arrangement TX/RX 420a, e.g. transceiver circuitry or transceiver module, configured to transmit and receive radio signals.

The arrangement 400a comprises a transmitting arrangement TRANS 402a e.g. transmitting circuitry or transmitting module, configured to transmit over the communication network a sequence for the system to the vehicle wherein the sequence comprises a first sound sequence, and a receiving arrangement REC 401a, e.g. receiving circuitry or receiving module, configured to receive from the system over the communication network a challenge response wherein the challenge response comprises a second sound sequence.

The transmitting arrangement TRANS 402a is further configured to transmit over the communication network a response for the system to the vehicle in response to receiving the challenge response wherein the response comprises a third sound sequence.

The arrangement 400a further comprises a memory arrangement MEM 403a, e.g. memory circuitry or memory module, configured to store at least one sound sequence for at least one key related function for the system of key related functions of the vehicle, and a selecting arrangement K FUNC SEL 404a, e.g. selecting circuitry or selecting module, configured to select at least one key related function i.e. a sound sequence.

The arrangement 400b is configured to be associated or operatively connected with a microphone arrangement MIC 430b, e.g. microphone circuitry or microphone module, configured to receive sound sequences, and a loudspeaker arrangement LOUD 440b, e.g. loudspeaker circuitry or loudspeaker module, configured to output sound sequences.

The arrangement 400b may be configured to, in some embodiments, to be associated or operatively connected with a transmitting/receiving arrangement TX/RX 420b, e.g.

transceiver circuitry or transceiver module, configured to transmit and receive radio signals.

The arrangement 400b comprises a receiving arrangement REC 401b, e.g. receiving circuitry or receiving module, configured to receive over the communication network a sequence for the system wherein the sequence comprises a first or third sound sequence, and a transmitting arrangement TRANS 402b e.g. transmitting circuitry or transmitting module, configured to transmit over the communication network a challenge response to the arrangement for remotely controlling the system in response to receiving the sequence wherein the challenge response comprises a second sound sequence.

The arrangement 400b further comprises a memory arrangement MEM 403b, e.g. memory circuitry or memory module, configured to at least one sound sequence for at least one key related function for the system of key related functions of the vehicle, and a controlling arrangement K FUNC CNTRL 404b, e.g. controlling circuitry or controlling module, configured to perform at least one key related function in response to receiving the first or third sound sequence.

FIG. 5 is a schematic drawing illustrating an example computer readable medium according to some embodiments. The computer program product comprises a non-transitory computer readable medium 500 having thereon a computer program 510 comprising program instructions, wherein the computer program being loadable into a data processing unit and configured to cause execution of the method steps of any of the methods described in connection with FIG. 1 and/or the signaling steps of any of the signaling described in connection with FIG. 2.

Generally, when an arrangement is referred to herein, it is to be understood as a physical product; e.g., an apparatus. The physical product may comprise one or more parts, such as controlling circuitry in the form of one or more controllers, one or more processors, or the like.

The described embodiments and their equivalents may be realized in software or hardware or a combination thereof. The embodiments may be performed by general purpose circuitry. Examples of general purpose circuitry include digital signal processors (DSP), central processing units (CPU), co-processor units, field programmable gate arrays (FPGA) and other programmable hardware. Alternatively or additionally, the embodiments may be performed by specialized circuitry, such as application specific integrated circuits (ASIC). The general purpose circuitry and/or the specialized circuitry may, for example, be associated with or comprised in an apparatus such as a vehicle.

Embodiments may appear within an electronic apparatus (associated with or comprised in a vehicle) comprising arrangements, circuitry, and/or logic according to any of the embodiments described herein. Alternatively or additionally, an electronic apparatus (associated with or comprised in a vehicle) may be configured to perform methods according to any of the embodiments described herein.

According to some embodiments, a computer program product comprises a computer readable medium such as, for example a universal serial bus (USB) memory, a plug-in card, an embedded drive or a read only memory (ROM). FIG. 5 illustrates an example computer readable medium in the form of a compact disc (CD) ROM 500. The computer readable medium has stored thereon a computer program comprising program instructions. The computer program is loadable into a data processor (PROC) 520, which may, for example, be comprised in a vehicle 510. When loaded into the data processing unit, the computer program may be stored in a memory (MEM) 530 associated with or comprised in the data-processing unit. According to some embodiments, the computer program may, when loaded into and run by the data processing unit, cause execution of method steps according to, for example, any of the methods illustrated in FIG. 1 or otherwise described herein.

Generally, all terms used herein are to be interpreted according to their ordinary meaning in the relevant technical field, unless a different meaning is clearly given and/or is implied from the context in which it is used.

Reference has been made herein to various embodiments. However, a person skilled in the art would recognize numerous variations to the described embodiments that would still fall within the scope of the claims.

For example, the method embodiments described herein discloses example methods through steps being performed in a certain order. However, it is recognized that these sequences of events may take place in another order without departing from the scope of the claims. Furthermore, some method steps may be performed in parallel even though they have been described as being performed in sequence. Thus, the steps of any methods disclosed herein do not have to be performed in the exact order disclosed, unless a step is explicitly described as following or preceding another step and/or where it is implicit that a step must follow or precede another step.

In the same manner, it should be noted that in the description of embodiments, the partition of functional blocks into particular units is by no means intended as limiting. Contrarily, these partitions are merely examples. Functional blocks described herein as one unit may be split into two or more units. Furthermore, functional blocks described herein as being implemented as two or more units may be merged into fewer (e.g. a single) unit.

Any feature of any of the embodiments disclosed herein may be applied to any other embodiment, wherever suitable. Likewise, any advantage of any of the embodiments may apply to any other embodiments, and vice versa.

Hence, it should be understood that the details of the described embodiments are merely examples brought forward for illustrative purposes, and that all variations that fall within the scope of the claims are intended to be embraced therein.

What is claimed is:

1. A method for remotely controlling a system of key related functions of a vehicle wherein the system is connectable with a remote unit over a communication network capable of transferring audio data, the method comprising the following steps:
   receiving at the vehicle over the communication network a sequence for the system wherein the sequence comprises a first sound sequence,
   performing a key related function in the system in response to receiving the sequence,
   transmitting from the system over communication network a challenge response to the remote unit in response to receiving the sequence at the vehicle wherein the challenge response comprises a second sound sequence, and
   transmitting wherein the response comprises a third sound sequence.

2. The method according to claim 1, further comprising the step of:
   transmitting from the remote unit over the communication network the sequence for the system to the vehicle wherein the sequence comprises the first sound sequence.

3. The method according to claim 1, wherein the remote unit comprises a remote key comprising a Human Machine Interface, a loudspeaker capable of outputting sound sequences, and a microphone capable of receiving sound sequences and/or a mobile communication device comprising an application connectable with the system of the vehicle over the communication network and capable of outputting/receiving sound sequences.

4. The method according to claim 1, wherein the sound sequence comprises a sound with tones at high and/or low frequencies each with a certain duration and/or a sound with tones at high and/or low amplitudes each with a certain duration.

5. The method according to claim 1, wherein the communication network comprises any one of a cellular communication network, a mobile communication network, a packet-switched network, and a wired network.

6. A non-transitory computer readable medium, having stored thereon a computer program comprising program instructions, the computer program being loadable into a data processing unit and configured to cause execution of the method steps performed by the system of key related functions of the vehicle and/or the method steps performed by the remote unit according to claim 1 when the computer program is run by the data processing unit.

7. An arrangement for remotely controlling a system of key related functions of a vehicle wherein the system is connectable with the arrangement over a communication network capable of transferring audio data, the arrangement comprising:
 a memory comprising executable instructions, one or more processors configured to communicate with the memory wherein the one or more processors are configured to cause the arrangement to:
 transmit over the communication network a sequence for the system to the vehicle wherein the sequence comprises a first sound sequence,
 receive from the system over the communication network a challenge response wherein the challenge response comprises a second sound sequence, and
 transmit over the communication network a response for the system to the vehicle in response to receiving the challenge response wherein the response comprises a third sound sequence.

8. The arrangement according to claim 7, wherein the arrangement comprises a Human Machine Interface, a loudspeaker capable of outputting sound sequences, and a microphone capable of receiving sound sequences and/or a mobile communication device comprising an application connectable with the system of the vehicle over the communication network and capable of outputting/receiving sound sequences.

9. The arrangement according to claim 7, wherein the arrangement further comprises a memory comprising at least one sound sequence for at least one key related function for the system of key related functions of the vehicle.

10. A remote key and/or a mobile communication device comprising the arrangement according to claim 8.

11. An arrangement for performing a key related function in a system of key related functions of a vehicle wherein the system is connectable with the arrangement for remotely controlling the system over a communication network capable of transferring audio data, the arrangement comprising:
 a memory comprising executable instructions, one or more processors configured to communicate with the memory wherein the one or more processors are configured to cause the arrangement to:
 receive over the communication network a sequence for the system wherein the sequence comprises a first sound sequence,
 perform a key related function in the system in response to receiving the sequence,
 transmit over the communication network a challenge response to the arrangement for remotely controlling the system in response to receiving the sequence wherein the challenge response comprises a second sequence, and
 receive a response over the communication network from the arrangement for remotely controlling the system in response to transmitting the challenge response wherein the response comprises a third sound sequence.

12. The arrangement according to claim 11, wherein the arrangement further comprises a memory comprising at least one sound sequence for at least one key related function for the system of key related functions of the vehicle.

13. A system of key related functions of a vehicle comprising the arrangement according to claim 11.

* * * * *